Patented May 10, 1932

1,857,878

UNITED STATES PATENT OFFICE

WALTER SCHOELLER AND MAX GEHRKE, OF BERLIN, GERMANY, ASSIGNORS TO SCHERING-KAHLBAUM A. G., OF BERLIN, GERMANY

RECOVERY OF A WATER SOLUBLE PREPARATION OF THE HORMONE OF THE ANTERIOR LOBE OF THE PITUITARY GLAND

No Drawing. Application filed September 25, 1929, Serial No. 395,197, and in Germany October 10, 1928.

Our invention refers to the recovery of a water soluble preparation of the hormone of the anterior lobe of the pituitary gland.

As it is well known the hormone of the anterior lobe of the pituitary gland can be precipitated from the urine of gravid mammals by means of organic solvents. However the deposits thus recovered are highly adulterated with salts among them such which are not again soluble in water and which retain the hormone. Therefore the yield of a purified hormone is by no means satisfactory.

We have found that this difficulty can be avoided by precipitating the calcium salts from the urine. This can be effected by adding alkaline or ammonia salts containing anions which form with calcium salts, precipitates which are insoluble in water. It is advantageous to make use of the alkaline or ammonia salts of acids, the calcium salts of which are also insoluble in a watery solution of weak acid reaction, such as for instance the salts of the oxalic acid.

*Example*

To the urine of a gravid mammal a concentrated solution of sodium oxalate is added in a quantity which is sufficient to precipitate the calcium salts. The whole is then allowed to stand for some hours at room temperature. The deposit is then separated by decanting, filtering or centrifuging. By adding to the remaining liquid an organic solvent such as for instance alcohol, a deposit is obtained, which is practically entirely soluble in water. This hormone preparation can be worked up and purified in a well known manner.

Various changes may be made in the details described in the foregoing specification without departing from the invention or sacrificing the advantages thereof.

We claim:

1. In a process for the recovery of a water soluble preparation of the hormone of the anterior lobe of the pituitary gland, the steps of removing soluble calcium salts by treating the urine of gravid mammals with water soluble salts, the anions of which form with calcium salts a water insoluble deposit, and removing the deposit thus formed.

2. In a process for the recovery of a water soluble preparation of the hormone of the anterior lobe of the pituitary gland the step or removing soluble calcium salts by treating the urine of gravid mammals with water soluble salts, the anions of which form with calcium salts deposits which are insoluble in acidulated water, and removing the deposit thus formed.

3. In a process for the recovery of a water soluble preparation of the hormone of the anterior lobe of the pituitary gland, the step of removing soluble calcium salts by treating the urine of gravid mammals with water soluble oxalates, and removing the deposit thus formed.

4. In a process for the recovery of a water soluble preparation of the hormone of the anterior lobe of the pituitary gland, the step of removing soluble calcium salts by treating the urine of gravid mammals with sodium oxalate, and removing the deposit thus formed.

WALTER SCHOELLER.
MAX GEHRKE.